United States Patent
Brusarosco et al.

(10) Patent No.: US 9,884,525 B2
(45) Date of Patent: Feb. 6, 2018

(54) METHOD FOR INSTALLING A MONITORING DEVICE IN A TYRE FOR VEHICLE WHEELS

(71) Applicant: PIRELLI TYRE S.P.A., Milan (IT)

(72) Inventors: Massimo Brusarosco, Milan (IT); Federico Mancosu, Milan (IT)

(73) Assignee: PIRELLI TYRE S.P.A., Milan (IT)

(*) Notice: Subject to any disclaimer, the term of this patent is extended or adjusted under 35 U.S.C. 154(b) by 0 days.

(21) Appl. No.: 14/373,238

(22) PCT Filed: Jan. 24, 2013

(86) PCT No.: PCT/IB2013/050598
§ 371 (c)(1),
(2) Date: Jul. 18, 2014

(87) PCT Pub. No.: WO2013/111073
PCT Pub. Date: Aug. 1, 2013

(65) Prior Publication Data
US 2014/0360019 A1    Dec. 11, 2014

Related U.S. Application Data

(60) Provisional application No. 61/611,412, filed on Mar. 15, 2012.

(30) Foreign Application Priority Data

Jan. 26, 2012  (IT) .............................. MI2012A0090

(51) Int. Cl.
  *B29D 30/06*   (2006.01)
  *B60C 23/04*   (2006.01)
  (Continued)

(52) U.S. Cl.
  CPC ...... *B60C 23/0493* (2013.01); *B29D 30/0061* (2013.01); *B60C 25/00* (2013.01);
  (Continued)

(58) Field of Classification Search
  CPC ........ B29D 30/0061; B29D 2030/0077; B29D 2030/0088; B29D 2030/0083; B60C 23/0493
  See application file for complete search history.

(56) References Cited

U.S. PATENT DOCUMENTS 581,945 A * 5/1897 Scott ...................... B29C 73/08
                                                              152/370
2,773,158 A * 12/1956 Myers ............................ 338/19
(Continued)

FOREIGN PATENT DOCUMENTS

DE    10 2007 030 238    1/2009
DE    10 2009 006 707    8/2010
(Continued)

OTHER PUBLICATIONS

Machine generated English language translation of JP 2007-331293 (original document dated Dec. 2007).*
(Continued)

*Primary Examiner* — Martin Rodgers
(74) *Attorney, Agent, or Firm* — Finnegan, Henderson, Farabow, Garrett & Dunner, L.L.P.

(57) ABSTRACT

A method for installing a monitoring device in a tire for vehicle wheels, includes: providing a monitoring device including: an electronic unit; a connecting member having an upper structure and a lower structure that, in cooperation, define a housing for the electronic unit, the lower structure including two base portions mutually separated by a separation region, each of the base portions having a respective base surface associable with an inner surface of a tire. The
(Continued)

method further includes providing a positioning device including two separate active portions, each having a main surface in the shape of which matches that of a respective portion of an outer surface of the monitoring device, the separate active portions being adapted to cooperate with at least the base portions; associating the positioning device with the monitoring device to keep the monitoring device in an installation condition in which the base portions are maintained at a given mutual distance by the active portions; fastening the base portions to the inner surface of the tire; and removing the positioning device.

10 Claims, 15 Drawing Sheets

(51) Int. Cl.
    *B60C 25/00* (2006.01)
    *B29D 30/00* (2006.01)
(52) U.S. Cl.
    CPC ............ *B29D 2030/0072* (2013.01); *B29D 2030/0077* (2013.01); *Y10T 29/49492* (2015.01); *Y10T 29/53448* (2015.01)

(56) References Cited

U.S. PATENT DOCUMENTS

| | | | | |
|---|---|---|---|---|
| 4,395,170 | A * | 7/1983 | Clarey | 408/241 R |
| 5,245,131 | A * | 9/1993 | Golden | H02B 1/305 174/652 |
| 5,971,046 | A * | 10/1999 | Koch | B60C 23/04 152/152.1 |
| 6,030,478 | A | 2/2000 | Koch et al. | |
| 6,386,251 | B1 | 5/2002 | Koch et al. | |
| 6,860,303 | B2 | 3/2005 | Rensel et al. | |
| 7,009,506 | B2 | 3/2006 | Wilson et al. | |
| 7,874,205 | B2 | 1/2011 | Hironaka | |
| 7,908,918 | B2 | 3/2011 | Brusarosco et al. | |
| 8,061,400 | B2 * | 11/2011 | Landers et al. | 152/524 |
| 8,734,408 | B2 * | 5/2014 | Marx | 604/298 |
| 2006/0032564 | A1 * | 2/2006 | Weaver | B60C 23/0408 152/152.1 |
| 2008/0060761 | A1 | 3/2008 | Weaver | |
| 2009/0101257 | A1 * | 4/2009 | Brusarosco et al. | 152/151 |
| 2009/0183562 | A1 * | 7/2009 | Brusarosco et al. | 73/146.5 |
| 2009/0266153 | A1 | 10/2009 | Hironaka | |
| 2009/0320580 | A1 * | 12/2009 | Mancosu et al. | 73/146 |
| 2011/0240195 | A1 | 10/2011 | Ellmann | |

FOREIGN PATENT DOCUMENTS

| | | | | |
|---|---|---|---|---|
| DE | 10 2009 025 794 | | 11/2010 | |
| EP | 1 627 753 | | 2/2006 | |
| EP | 1 948 452 | | 1/2009 | |
| IT | MI 2001 A 002426 | | 12/2011 | |
| IT | MI 2001 A 002427 | | 12/2011 | |
| JP | 2007-099052 | | 4/2007 | |
| JP | 2007-331293 | * | 12/2007 | ............ B29D 30/06 |
| WO | WO 2004/048132 | * | 6/2004 | ............ B60C 23/04 |
| WO | WO 2006/126215 | | 11/2006 | |
| WO | WO 2007/048621 | | 5/2007 | |
| WO | WO 2007/049093 | | 5/2007 | |
| WO | WO 2007/121768 | | 11/2007 | |
| WO | WO 2010/043264 | | 4/2010 | |
| WO | WO 2013/098711 | | 7/2013 | |
| WO | WO 2013/098712 | | 7/2013 | |

OTHER PUBLICATIONS

Machine generated English language translation of WO 2004/048132 (original document dated Jun. 2004).*
International Search Report from the European Patent Office for International Application No. PCT/IB2013/050598, dated Apr. 18, 2013.
Written Opinion of the International Searching Authority from the European Patent Office for International Application No. PCT/IB2013/050598, dated Apr. 18, 2013.
Continental Reifen Deutschland; English-language translation and abstract of DE 10 2009 025794, Nov. 18, 2010.
Continental AG; English-language translation and abstract of DE 10 2007 030 238; Jan. 8, 2009.

* cited by examiner

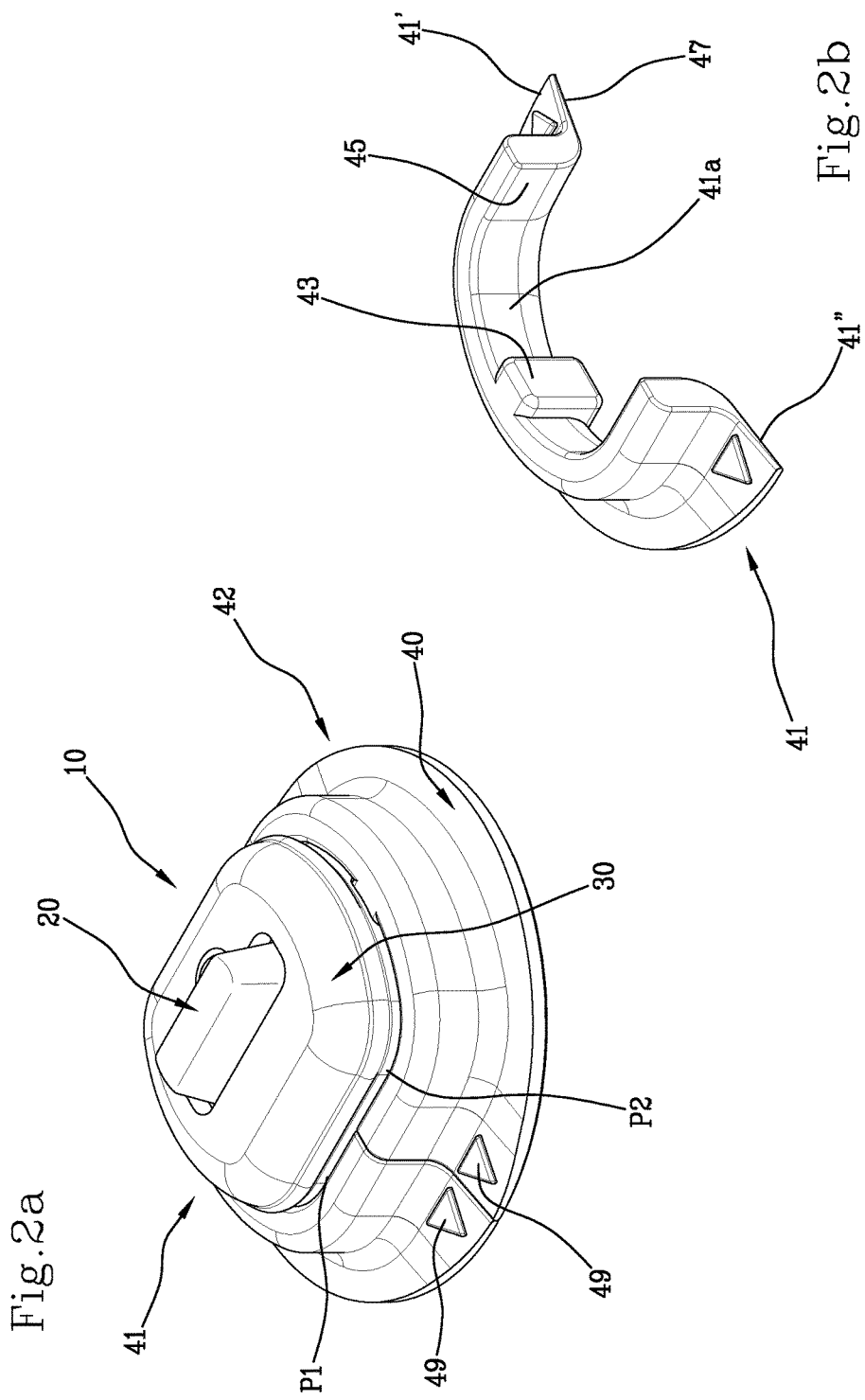

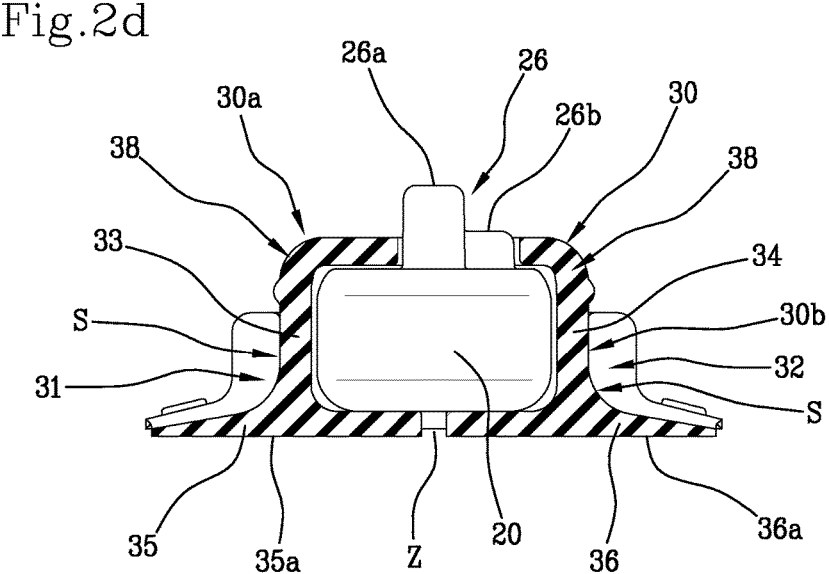
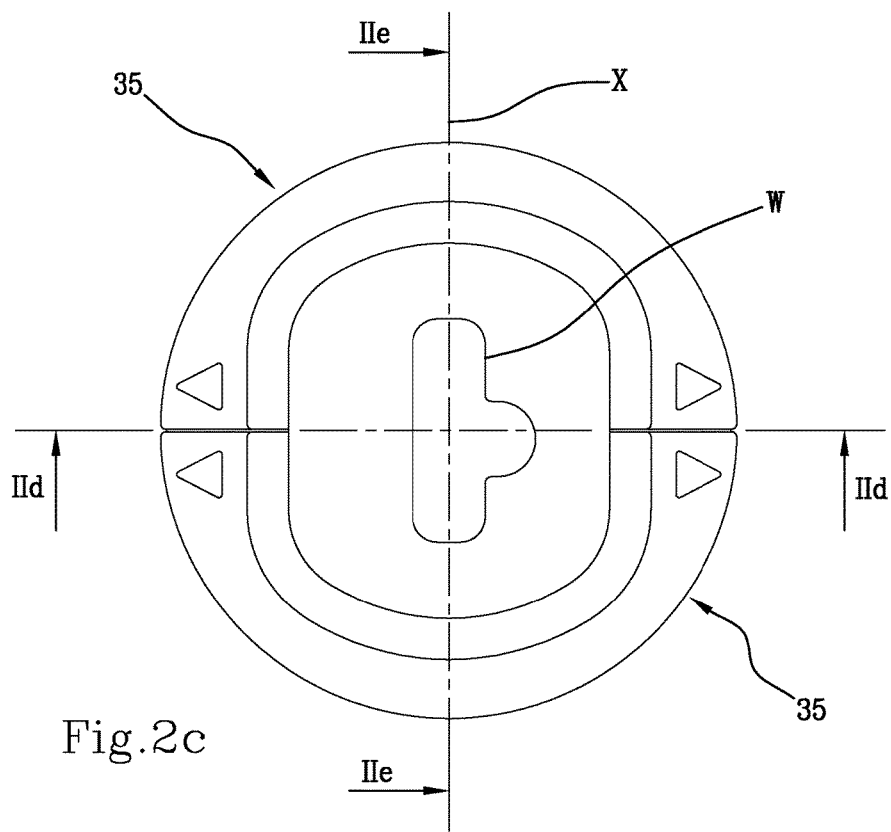

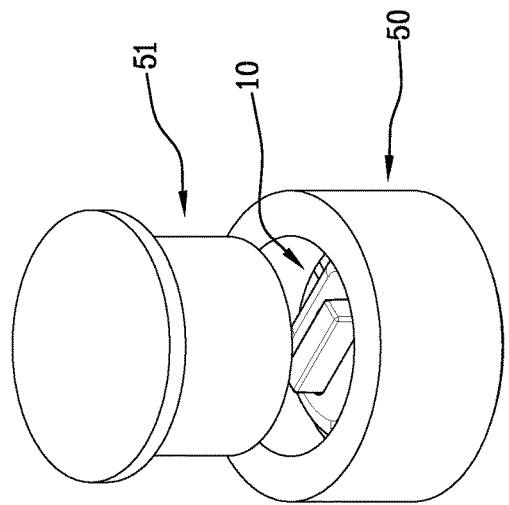
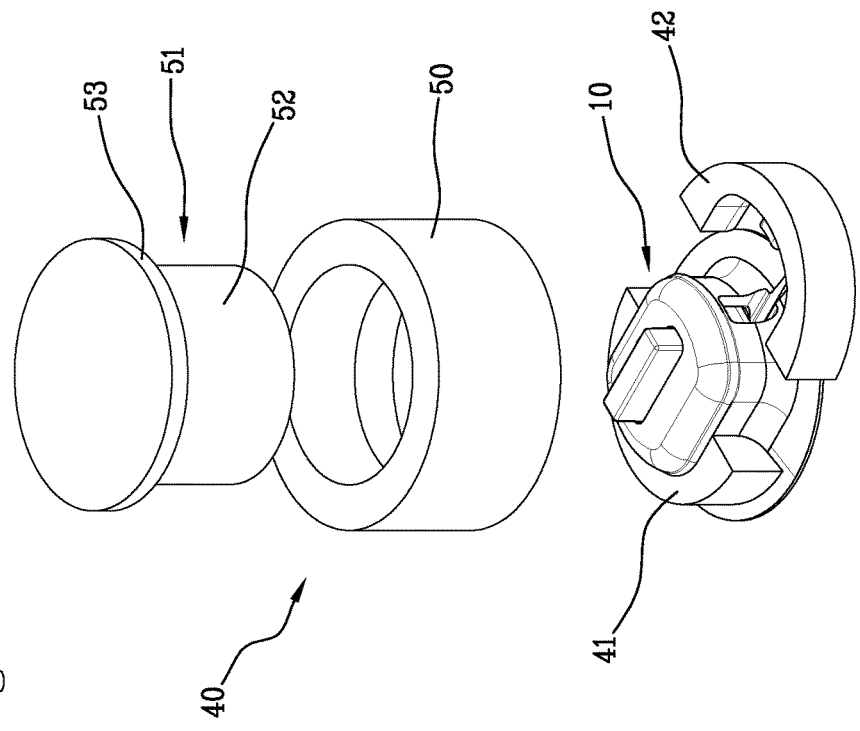

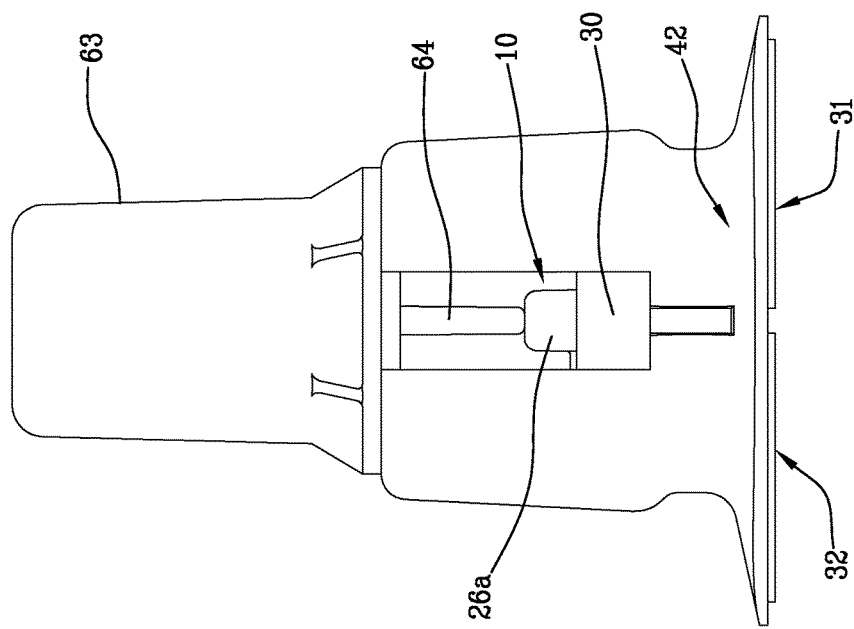
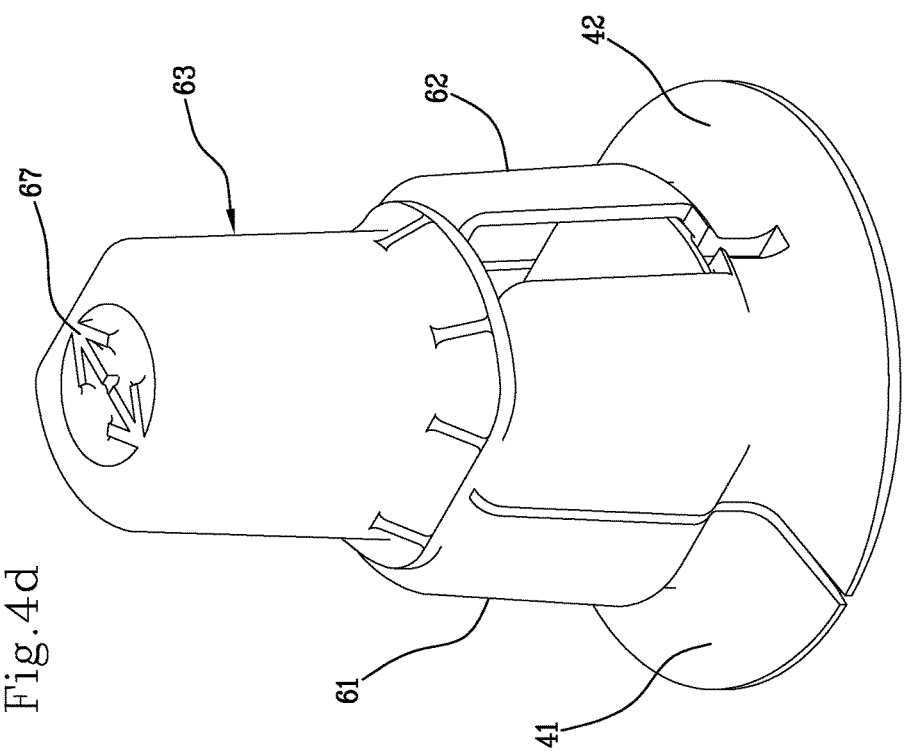

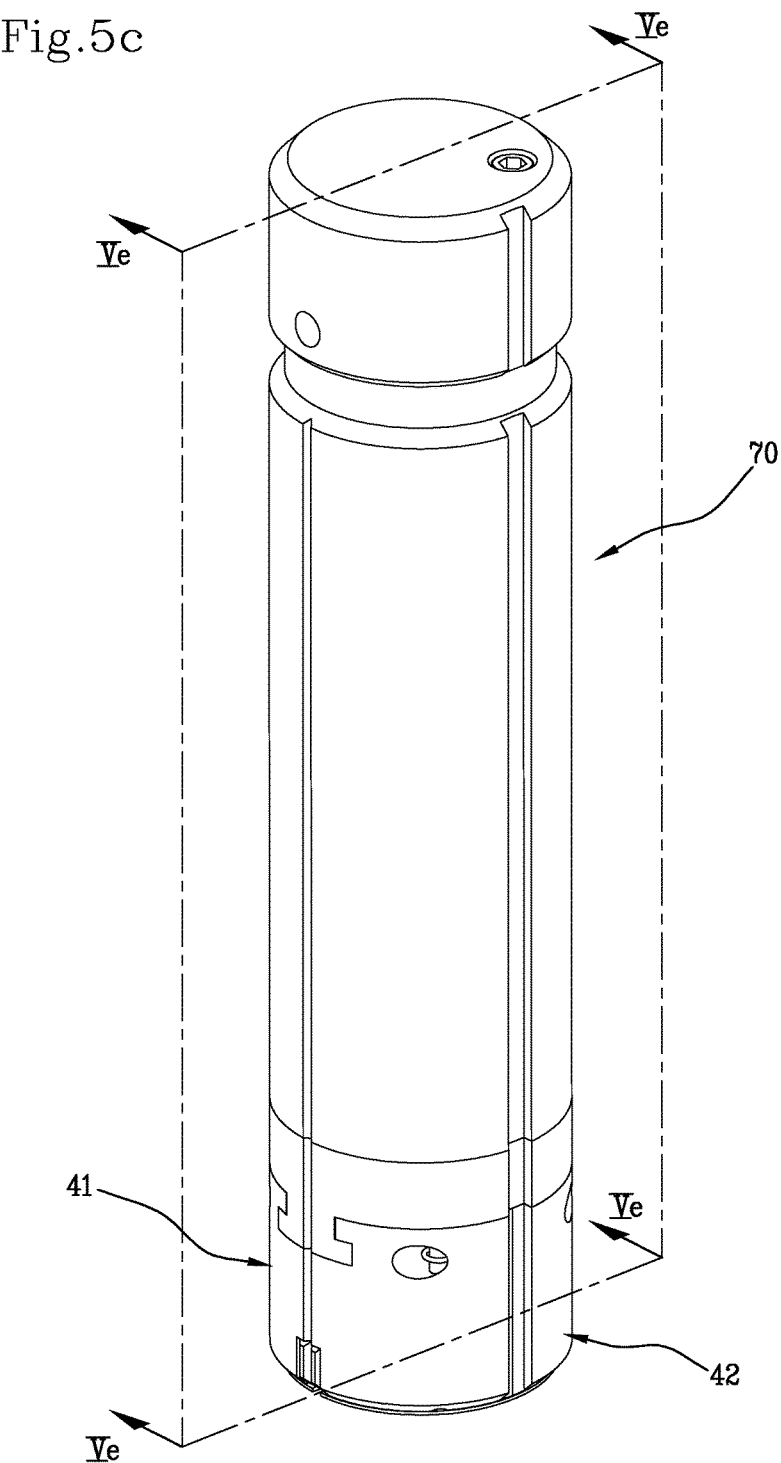

METHOD FOR INSTALLING A MONITORING DEVICE IN A TYRE FOR VEHICLE WHEELS

CROSS REFERENCE TO RELATED APPLICATIONS

This application is a national phase application based on PCT/IB2013/050598, filed Jan. 24, 2013, which claims the priority of Italian Patent Application No. MI2012A000090, filed Jan. 26, 2012, and the benefit of U.S. Provisional Application No. 61/611,412, filed Mar. 15, 2012, the content of each application being incorporated herein by reference.

BACKGROUND OF THE INVENTION

Field of the Invention

The present invention has as subject a method for installing a monitoring device in a tyre for vehicle wheels.

The present invention further regards a positioning device adapted to keep a monitoring device for tyres for vehicle wheels in an installation condition. Such positioning device is advantageously used in said installation method.

Description of the Related Art

The need to monitor the operating conditions of the tyres in real time, and possibly store the time evolution of parameters representative of such operation, has assumed increasing importance due to the increasing safety requirements imposed on vehicles by clients and/or national directives/legislation.

The parameters generally considered and/or monitored can be, for example, temperature and pressure of the tyre, distance travelled by the tyre (and/or number of revolutions), load acting on the tyre, as well as other parameters which derive from mathematical processing that can be executed on the basis of signals detected by sensors placed inside the tyres.

The parameters can also be used for identifying particular conditions in which the tyre and/or the vehicle are found, such as wear conditions, aquaplane conditions etc. and, more generally, for monitoring the stresses acting on the tyre during the rolling thereof (e.g. on a road surface).

The date detected or calculated can also be employed for the optimization of the set-up of passive control systems of the vehicle, e.g. systems adapted to verify the suitability between the type of tyre actually installed and the types of tyre provided and considered acceptable and/or approved for such vehicle, as well as active control systems, which use, among other parameters, those identifying the type of tyre for actively operating on the operation of the vehicle, in order to maintain the latter in safety conditions (e.g. ABS, ESP, etc.).

For such purpose, inside the tyre an electronic unit can be mounted, comprising at least one sensor.

The electronic unit can be mounted on the inner surface of the tyre by means of a connecting member, for example made of elastomeric material.

Documents U.S. Pat. No. 6,030,478, U.S. Pat. No. 6,386,251, U.S. Pat. No. 6,860,303, U.S. Pat. No. 7,009,506, EP 1948452, U.S. Pat. No. 7,908,918 and U.S. Pat. No. 7,874,205 show several techniques by means of which an electronic unit can be associated with the inner surface of the tyre.

SUMMARY OF THE INVENTION

The Italian patent applications MI2011A002426 and MI2011A002427, on behalf of the same Applicant, describe monitoring devices equipped with particular members for connecting to the tyre, such connecting members provided with a cavity inside of which the electronic unit is housed.

Such connecting members have two base portions separated from each other, which are adapted to be fastened, e.g. by means of bonding, to the inner surface of a tyre. The Applicant found that the presence of two portions separated from each other allows distributing and dampening in a particularly effective manner the deformations caused by the stresses transmitted to the deformation member by the tyre during rolling (also at high and very high speed), so as to advantageously increase the reliability and lifetime of the monitoring device and/or of the bond between the monitoring device and the tyre. The Applicant also found that it is convenient, for the purpose of effectively dissipating the stresses transmitted to the monitoring device by the tyre during rolling, to provide a cavity inside the connecting member with size such to leave one or more interspaces between the outer surface of the electronic unit and the walls defining the housing cavity, so as to contain the electronic unit in a loose manner inside the connecting member.

The Applicant however observed that, the connecting member being made of elastically deformable material, it is possible that, during the fastening of the base portions to the inner surface of the tyre, such base portions may be positioned in an incorrect manner and/or a perfect coupling may not be ensured of the base portions of the connecting member on the inner surface of the tyre, thus causing a decrease of the reliability and/or duration of the bond between the monitoring device and the inner surface of the tyre. Such risk is further increased in case of loose housing of the electronic unit in a cavity placed inside the connecting member, since the base portions thereof have a greater chance of being moved (especially in mutually moving close).

The Applicant found that the incorrect positioning of the base portions of the connecting member can bring the connecting member itself to being unable to resist the stresses transmitted by the tyre during rolling (especially at high speed), and give rise to the separation of the connecting member from the inner surface of the tyre, and/or to the formation of cracks in the connecting member, up to the partial or total breakage of the connecting member itself. Finally, this could lead the connecting member to be no longer capable of keeping the electronic unit associated with the inner surface of the tyre for the entire expected travel, and the electronic unit could therefore be free inside the tyre, when the latter is in operating condition, jeopardising both the quality of the detections and the possible executed processing, as well as the integrity of the circuitry and/or mechanical structure thereof.

The Applicant also observed that an incorrect positioning of the base portions can be caused by forces having non-negligible components in undesired directions, for example unintentionally imparted by the subject who (manually) executes the fastening operation, in the attempt to press, with great intensity, the connecting member against the inner surface of the tyre.

The Applicant verified that, for example, if an operator grasps the monitoring device at the connection region between the base walls and the lateral walls of the connecting member, it is possible that the action exerted for pressing the connecting member against the inner surface of the tyre has significant components also in a direction parallel to the inner surface of the tyre, and causes an undesired mutual moving close of the two base portions.

It is further verified that if an operator imparts a high pressure to the connecting member for the purpose of ensuring that the base portions adhere perfectly to the inner surface of the tyre, it can occur that such pressure is distributed in a non-uniform manner between the connection member and the inner surface of the tyre, so as to obtain the opposite result of that desired, i.e. a non-uniform adhesion of the base portions to the inner surface of the tyre. This can cause a decrease of the reliability of the bond between the monitoring device and the tyre, especially when the tyre operates at a high-speed (i.e. rolling) condition.

The Applicant found that one or more of these problems can be resolved by ensuring that, during the fastening operation, the monitoring device is maintained in an installation condition, in which the two base portions are mutually spaced according to a given distance, so as to be positioned and constrained in a suitable manner on the inner surface of the tyre.

The Applicant also found that associating a suitable positioning device capable of maintaining the base portions at a given mutual distance with the monitoring device, during fastening on the inner surface of the tyre, allows obtaining this result.

The Applicant also found that associating a suitable device capable of acting peripherally at least on the base portions of the connecting member with the monitoring device during fastening on the inner surface of the tyre, allows controlling the pressure exerted on the connecting member, so as to distribute it substantially uniformly on the outer surface of the connecting member (especially the base portions thereof) and ensure a uniform adhesion of the connecting member itself to the inner surface of the tyre.

According to a first aspect, the invention regards a method for installing, in a controlled manner, a monitoring device in a tyre for vehicle wheels, comprising:
  providing a monitoring device including:
    an electronic unit;
    a connecting member having an upper structure and a lower structure that in cooperation define a housing for said electronic unit, said lower structure comprising two base portions mutually separated by a separation region, each of said base portions having a respective base surface associable with an inner surface of a tyre;
  providing a positioning device including two separate active portions, each having a main surface the shape of which matches that of a respective portion of an outer surface of said monitoring device, said separate active portions being adapted to cooperate with at least said base portions;
  associating said positioning device with said monitoring device to keep said monitoring device in an installation condition in which said base portions are maintained at a given mutual distance by said active portions;
  fastening said base portions to the inner surface of said tyre;
  removing said positioning device.

The Applicant deems that, in this manner, the base portions of the connecting member being part of the monitoring device can be correctly positioned in a stable manner during the fastening operation, and a durable and reliable bond can therefore be obtained, even against the mechanical stresses to which the monitoring device is subjected during the rolling of the tyre.

According to another aspect, the invention regards a positioning device for keeping a monitoring device in an installation condition, said positioning device comprising two separate active portions, each having a main surface the shape of which matches that of a respective portion of an outer surface of a monitoring device, said separate active portions being adapted to cooperate with at least base portions of said monitoring device, so that, when said positioning device is associated with said monitoring device, the base portions of said monitoring device are maintained at a given mutual distance by said active portions.

According to a further aspect, the invention regards a kit for installation of a monitoring device in a tyre for vehicle wheels, comprising:
  a monitoring device provided with:
    an electronic unit;
    a connecting member having an upper structure and a lower structure that in cooperation define a housing for said electronic unit, said lower structure comprising two base portions mutually separated by a separation region, each of said base portions having a respective base surface associable with an inner surface of a tyre;
  a positioning device comprising two separate active portions, each having a main surface the shape of which matches that of a respective portion of an outer surface of said monitoring device, said separate active portions being adapted to cooperate with at least said base portions,
said positioning device being associated with said monitoring device to keep said monitoring device in an installation condition in which said base portions are maintained at a given mutual distance.

In accordance with one or more of the abovementioned aspects, the invention can comprise one or more of the preferred characteristics indicated hereinbelow.

Preferably, associating said positioning device with said monitoring device comprises putting each of said main surfaces in a condition of substantial mutual contact with the respective outer-surface portions of said monitoring device.

More preferably, associating said positioning device with said monitoring device comprises putting each of said main surfaces in a condition of substantial mutual contact at least with the outer-surface portions of said base portions.

Preferably, removing said positioning device comprises moving said main surfaces away from the respective outer-surface portions of said monitoring device.

Preferably, said positioning device, when it is associated with said monitoring device, surrounds said monitoring device in a substantially continuous peripheral manner according to at least one plane substantially parallel to said base surfaces in at least one portion thereof.

In this manner, a distribution of possible forces exerted in directions substantially orthogonal to the inner surface of the tyre during the fastening operation along the perimeter extension of the monitoring device is promoted, so as to obtain a reliable and durable bond.

Preferably, each of said active portions comprises a respective expansion extending from the respective main surface.

Preferably, associating said positioning device with said monitoring device comprises inserting each respective expansion between said base portions.

In this manner, the monitoring device is maintained in its installation condition, so that the base portions thereof are maintained at the provided distance at least during the operation of fastening to the inner surface of the tyre.

Preferably, said respective expansions are inserted between said base portions from opposite sides of said monitoring device relative to said electronic unit.

Preferably, each of said active portions seen in plan view has a substantially C-shaped conformation having a pair of ends in which, when said positioning device is associated with said monitoring device, the ends of each of said active portions are substantially in contact with the ends of the other active portion.

By means of this structure, a hooping action is exerted on the monitoring device, and such hooping action contributes to stably maintaining the monitoring device itself in the installation condition, opposing possible mutual moving apart of the base portions. In addition, the structure allows acting peripherally on the outer surface of the base portions, so as to distribute the forces applied in a direction substantially orthogonal to the inner surface of the tyre in a substantially uniform manner.

In one embodiment, after associating said positioning device with said monitoring device, a ring nut is fitted around said positioning device, the ring nut being adapted to maintain said active portions of said positioning device associated.

In this manner, the monitoring device is maintained in its installation condition in a still more reliable manner.

In one embodiment, a piston is inserted into said ring nut from the opposite side relative to said monitoring device, said ring nut being slidably associable with an outer surface of said piston.

In this manner, the piston and the ring nut can be removed, at the end of the fastening operation, in a simple and rapid manner.

Preferably, a force is exerted on said piston in a direction substantially orthogonal to the inner surface of said tyre for promoting fastening of said monitoring device to said inner surface.

Preferably, said ring nut and said piston are moved away from said monitoring device before removing said positioning device.

In one embodiment, said positioning device comprises a pair of lever elements, each extending from a respective one of said active portions, each of said lever elements having a distal end relative to the corresponding active portion, the distal ends of said lever elements being mutually associated in such a manner that said positioning device can be configured between an open condition and a closed condition.

Preferably, associating said positioning device with said monitoring device comprises:
configuring said positioning device in said open condition;
positioning said monitoring device between said active portions;
configuring said positioning device in said closed condition, in such a manner that said active portions close around said monitoring device under the action of said lever elements.

Preferably, a pooping member is at least partly fitted around said lever elements and/or said active portions of said positioning device to keep said positioning device in said closed condition.

Preferably, removing said positioning device comprises:
after fastening said monitoring device to the inner surface of said tyre, configuring said positioning device in said open condition;
moving said positioning device away from said monitoring device.

In one embodiment, said positioning device comprises an actuator member configured for driving said active portions between a mutually moved apart position and a mutually moved close position.

Preferably, associating said positioning device with said monitoring device comprises:
operating said actuator member for driving said active portions to said mutually moved apart position;
positioning said monitoring device between said active portions;
operating said actuator member for driving said active portions to said mutually moved close position.

Preferably removing said positioning device comprises:
after fastening said monitoring device to the inner surface of said tyre, operating said actuator member for driving said active portions to said mutually moved apart position;
moving said positioning device away from said monitoring device.

In one embodiment, said actuator member comprises:
a command element, that can be actuated in rotation;
a transmission element, interlocked with said command element, for moving said active portions upon the actuation of said command element.

Preferably, said transmission element can be configured in a first condition, in which it causes mutual moving apart between said active portions, and a second condition, in which it allows mutual moving close between said active portions.

Preferably said actuator member further comprises an elastic-return structure for moving said active portions close to each other when said transmission element is in said second condition.

Preferably said connecting member has an upper structure and a lower structure.

Each of said main surfaces of said positioning device, in a section evaluated when said positioning device is associated with said monitoring device, according to at least one plane substantially perpendicular to a plane defined by the base surfaces of said base portions, preferably has a substantially L-shaped conformation comprising a first and a second portion.

Said first portion of said substantially L-shaped conformation preferably substantially matches the shape of an outer surface of a side wall of said lower structure.

Said second portion of said substantially L-shaped conformation preferably substantially matches the shape of an outer surface of a base wall of said lower structure.

Preferably said positioning device further comprises a thrust element, associated with said hooping member, which can be positioned, when said hooping member is fitted around said active portions and/or said lever elements, in contact with said monitoring device on the opposite side relative to said base surfaces.

Further characteristics and advantages will be clearer from the description of a preferred and non-exclusive embodiment of the invention.

BRIEF DESCRIPTION OF THE DRAWINGS

Such description is provided hereinbelow with reference to the set of figures, which also have merely exemplifying and thus non-limiting object, in which:

FIG. 1b shows a block diagram of an electronic unit, the latter being part of the monitoring device of FIG. 1a;

FIG. 2a schematically shows a perspective view of a positioning device, in accordance with a first embodiment, associated with a monitoring device;

FIG. 2b schematically shows a perspective view of a portion of the device of FIG. 2a;

FIG. 2c shows a plan view of the positioning device and the monitoring device of FIG. 2a;

FIG. 2d shows a sectional view of the positioning device and the monitoring device along the line IId-IId shown in FIG. 2c;

FIG. 2f schematically shows a plan view of the positioning device of FIG. 2a;

FIG. 3a schematically shows an exploded view of a positioning device, in accordance with a second embodiment of the invention, associated with a monitoring device;

FIG. 3b shows, in an operative configuration, the positioning device of FIG. 3a;

FIG. 4d schematically shows a perspective view of the positioning device of FIG. 4a in a second operative condition;

FIG. 4e schematically shows a side view of the positioning device of FIG. 4d;

FIG. 5c shows the positioning device of FIG. 5a, 5b in a second operative condition;

DETAILED DESCRIPTION OF THE INVENTION

With reference to the attached figures, a tyre for vehicle wheels to which the installation method according to the present invention can be applied was indicated in its entirety with 1.

Figure 1A:
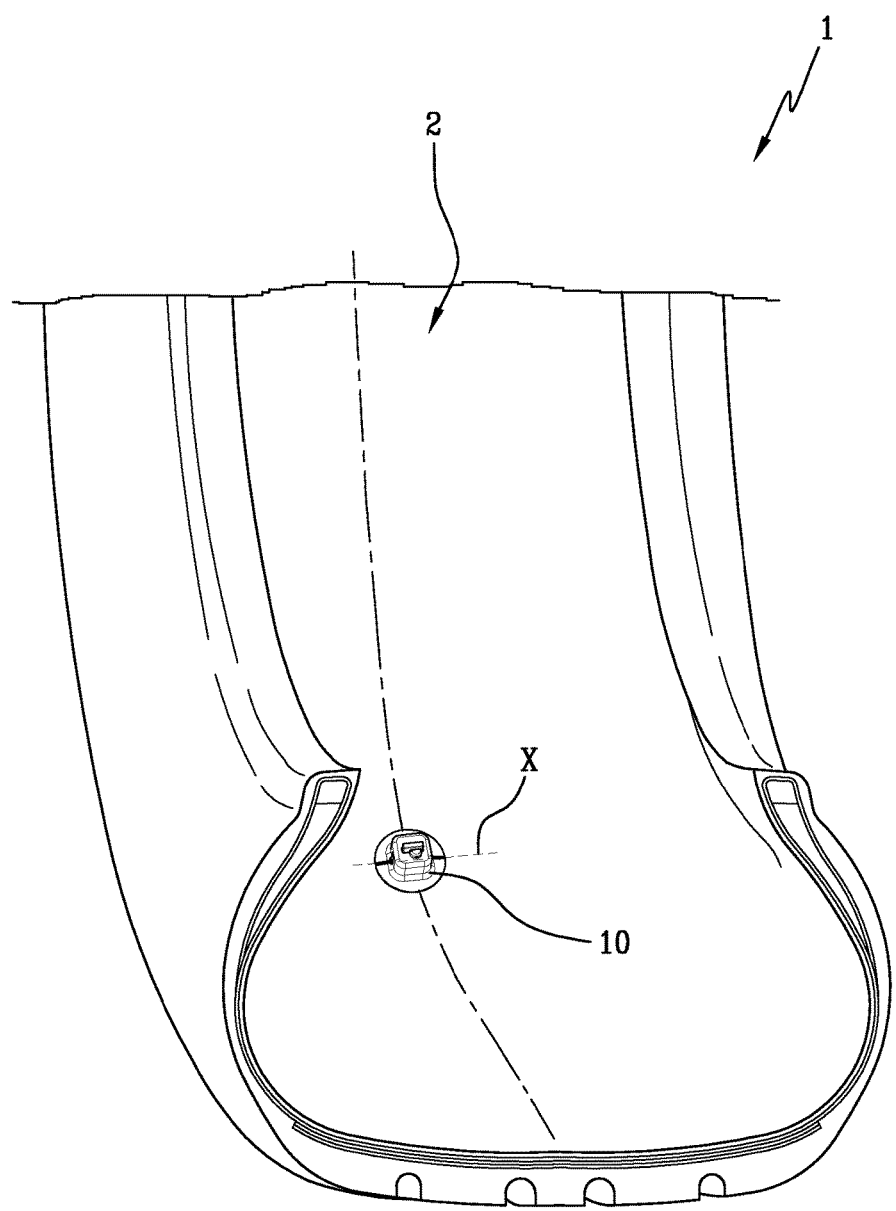
FIG. 1a schematically shows a tyre for vehicle wheels on which a monitoring device is mounted.
Figure 1B:
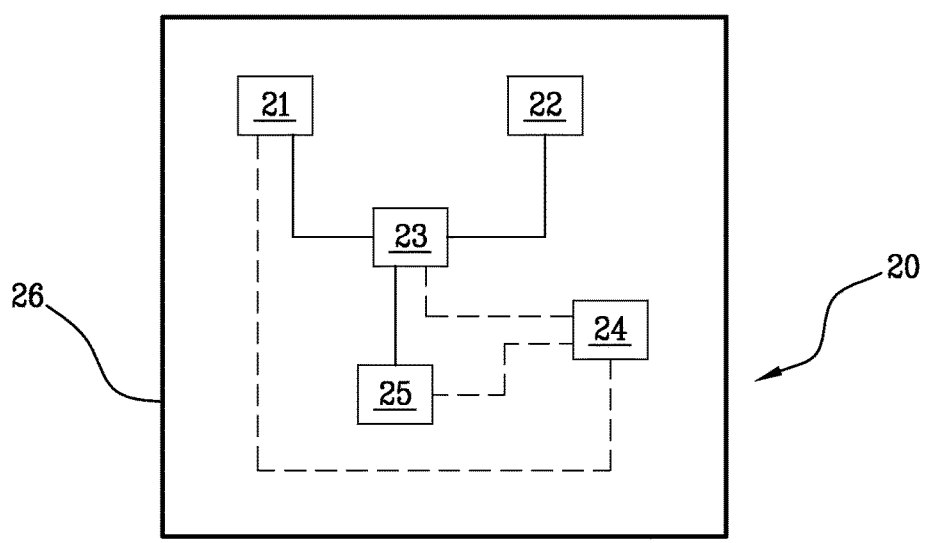

The tyre 1 (FIG. 1a) comprises an inner surface 2, preferably comprising or constituted by the so-called "liner".

The monitoring device 10 is mounted on such inner surface 2. The monitoring device 10 comprises an electronic unit 20 (FIGS. 1a, 1b, 2c, 2d).

Preferably, the electronic unit 20 comprises at least one sensor 21 and at least one antenna 22.

For example, said sensor 21 is a pressure and/or temperature sensor, configured for detecting a pressure and/or a temperature inside the tyre 1.

In a further embodiment, the sensor 21 can be a sensor of the accelerometer type, configured for detecting mechanical stresses to which the tyre 1 is subjected.

In addition or as an alternative, the sensor 21 can be a sensor of the inertial type.

In one embodiment, the sensor 21 can be constituted at least in part by a self-powering ("energy scavenger") system of the electronic unit, from which it is possible to obtain both the electrical power supply for the electronic unit itself, and signals, e.g. analogue signals, representative of the mechanical actions transmitted by the tyre.

In general, the sensor 21 can also be employed for determining the number of revolutions of the tyre and/or the load acting on the tyre and/or the angular speed and/or parameters representative of operating conditions of the tyre (e.g. friction, wear and/or aquaplane conditions).

The antenna 22 has at least the task of transmitting the data detected by the sensor 21 to the apparatuses on board the vehicle on which the tyre 1 is mounted.

Preferably the electronic unit 20 also comprises a processing circuit 23, associated with the sensor 21 and with the antenna 22.

The processing circuit 23 can have the task of managing (for example acquiring, and/or filtering, and/or processing) the signals detected by the sensor 21, for the purpose of obtaining the data to be stored and/or transmitted by means of the antenna 22.

Preferably, the electronic unit 20 further comprises a power supply system 24, predisposed to supply electrical power to the electronic unit 20.

Preferably the power supply system 24 comprises at least one battery. In addition or as an alternative to such battery, the power supply system 24 can comprise a device capable of transforming the mechanical energy transmitted to the device itself during the rolling of the tyre into electrical energy (energy scavenger).

The antenna 22 can also receive signals from the apparatuses on board the vehicle and/or from systems placed outside the vehicle itself. For example, the electronic unit 20 can comprise two antennas, of which one is predisposed to transmit (e.g. at a frequency of 433 MHz) the processed and/or stored data, and another predisposed to receive (e.g. at a frequency of 125 kHz) signals from systems placed on board the vehicle and/or outside the vehicle itself (e.g. wake-up signals for the monitoring device, and/or signals containing pre-configuration data for the monitoring device, and/or signals containing programming instructions for the monitoring device).

The electronic unit 20 can also comprise a memory 25, in which data relative to the operation of the tyre and/or configuration/setup data typically referred to the characteristics the tyre itself, and/or identification data of the monitoring device 10 and/or of the tyre 1 is stored. By way of example, in the memory 25 there can be stored data representative of the distance travelled by the tyre, preferably determined as a function of the overall number of revolutions carried out by the tyre itself. In the memory 25, it is also possible to store one or more procedures for processing the signal detected by the at least one sensor 21, and/or algorithms for calculating predetermined parameters starting from signals detected by the at least one sensor 21 (or on pre-processed signals), and/or signal filtering logic). Preferably the electronic unit 20 comprises a holding body 26, preferably rigid, in which the different elements (sensor, antenna, power supply system etc.) are housed.

The holding body 26 can be obtained according to techniques that are very well known, for example embedding the circuitry of the electronic unit 20 in a resin casting which stiffens following the solidification thereof, or by means of moulding.

Preferably the holding body 26 has at least one first expansion 26a inside which the antenna (or at least one of the antennas) 22 extends at least partly.

Preferably the holding body 26 has a second expansion 26b inside which the sensor 21 extends at least partly. In case of pressure sensor and/or temperature sensor, the second expansion 26b has an opening (not shown), for the purpose of allowing the sensor to carry out the necessary measurements.

The monitoring device 10 further comprises a connecting member 30.

When the monitoring device 10 is fastened to the tyre 1, the connecting member 30 maintains the electronic unit 20 constrained to the tyre 1, and in particular to the inner surface 2 of the latter.

Preferably the connecting member 30 is made in a single piece.

Preferably the connecting member 30 is made of elastomeric material. Such elastomeric material can for example comprise a thermoplastic elastomer. In a preferred embodiment, the elastomeric material comprises a halogenated butyl rubber and a synthetic rubber (e.g. polybutadiene, or polyisoprene).

Examples of elastomeric materials which can be employed are described in the international patent application published with number WO 2010/043264 on behalf of the same Applicant.

The connecting member 30 has a housing cavity for the electronic unit 20. Preferably, such housing cavity is configured in such a manner that the connecting member 30 substantially completely encloses the electronic unit 20 (except for some projecting portions, as will be described below), in a manner such that the latter cannot be extracted from the housing cavity once the connecting member 30 is fastened, by means of the base portions thereof, to the inner surface 2 of the tyre 1.

Preferably, the housing cavity has size such to ensure the formation of at least one interspace between the outer surface of the electronic unit 20 (in particular the containment body 26 thereof) and the inner walls of said connecting member 30 defining said housing cavity. In this embodiment, the electronic unit 20 is therefore enclosed in a loose manner inside the cavity predisposed in the connecting member 30.

The connecting member 30 comprises an upper structure 30a and a lower structure 30b.

The upper structure 30a and the lower structure 30b define, in cooperation, a housing for the electronic unit 20.

Preferably, the upper structure 30a comprises a top wall 38.

Preferably the top wall 38 has a rounded perimeter profile, for a connection with the lower structure 30b.

Preferably the top wall 38 has at least one through window W, in which the abovementioned first and/or second expansion 26a, 26b of the containment body 26 can be at least partially extended.

Preferably, the lower structure 30b comprises two base portions 31, 32.

Preferably, each base portion 31, 32 comprises a respective side wall 33, 34 and a respective base wall 35, 36.

Preferably, the side walls 33, 34 are separated by a pair of side windows 37a, 37b.

Preferably the base portions 31, 32, and in particular the base walls 35, 36, are separated by a separation region Z. The separation region Z has a major extension direction X.

Preferably each base portion 31, 32, and in particular each base wall 35, 36 has a respective base surface 35a, 36a, associable to the inner surface 2 of the tyre 1.

Preferably the base walls 35, 36 have, in plan view, a substantially circular conformation.

Preferably the major extension direction X of the separation region Z is directed along a diameter of said substantially circular conformation.

The method according to the invention comprises providing a positioning device 40 for keeping the monitoring device 10 in an installation condition, i.e. a condition in which the base portions 31, 32 are maintained at a given mutual distance.

The positioning device 40 comprises two separate active portions 41, 42.

Preferably, the active portions 41, 42 are made of a substantially rigid material, for example a plastic or metallic material.

Each active portion 41, 42 has a main surface 41a, 42a, the shape of which matches that of a respective portion P1, P2 of an outer surface S of the monitoring device 10.

The active portions 41, 42 are adapted to cooperate with at least the base portions 31, 32 to keep the monitoring device in the installation condition. In addition, the active portions 41, 42 are adapted to cooperate with at least the base portions 31, 32 in order to distribute the pressure exerted on the positioning device 40, in a substantially uniform manner along the perimeter of the monitoring device 10, in order to associate the connecting member 30 to the inner surface 2 of the tyre 1.

Preferably, the abovementioned outer surface S, and the relative portions P1, P2, are extended along the side walls 33, 34 and/or on the base walls 35, 36 of the lower structure 30b.

Advantageously, the outer surface S and the relative portions P1, P2 are extended both on the side walls 33, 34, and on the base walls 35, 36. In this manner, the active portions 41, 42 exert a pooping action around the monitoring device 10, and also allow distributing possible forces directed orthogonally to the inner surface 2 of the tyre 1 and aimed to promote the fastening operation in a substantially uniform manner.

The method according to the invention further comprises associating the positioning device 40 to the monitoring device 10.

Preferably such operation comprises placing each of the main surfaces 41a, 42a in a condition of substantial mutual contact with the respective outer-surface S portions P1, P2 of the monitoring device 10.

Preferably, in order to associate the active portions 41, 42 with the monitoring device 10, the same active portions 41, 42 are moved along directions substantially parallel to the plane defined by the abovementioned base surfaces 35a, 36a.

Preferably, such directions are substantially parallel to the major extension direction X of the separation region Z.

Preferably the positioning device 40, when it is associated with the monitoring device 10, surrounds said monitoring device 10 in a substantially continuous peripheral manner according to at least one plane a substantially parallel to the base surfaces 35a, 36a in at least one portion thereof.

Preferably each active portion 41, 42, seen in plan view, has a substantially C-shaped conformation having a pair of ends (41', 41", 42', 42").

Figure 2E:
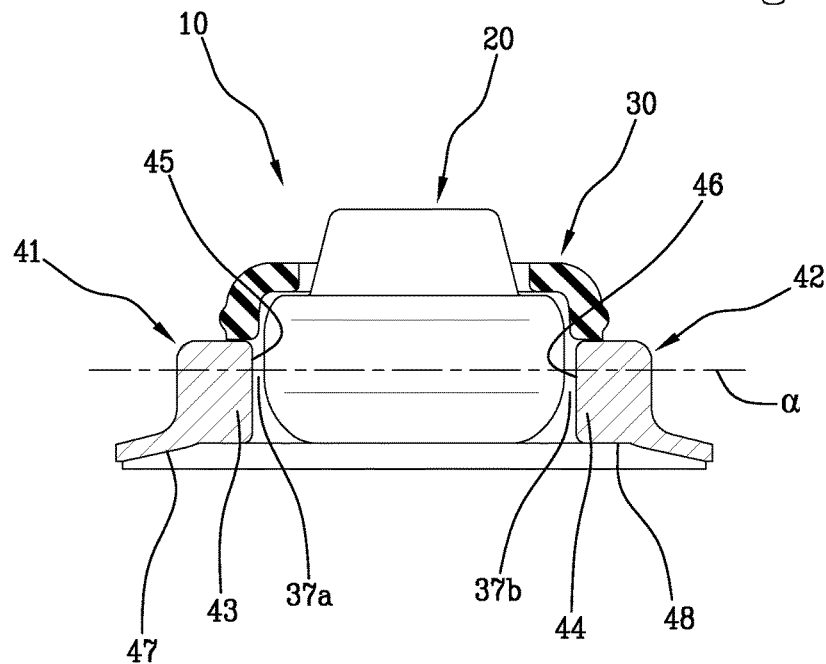
FIG. 2e shows a sectional view of the positioning device and the monitoring device along the line IIe-IIe shown in FIG. 2c.
Figure 2F:
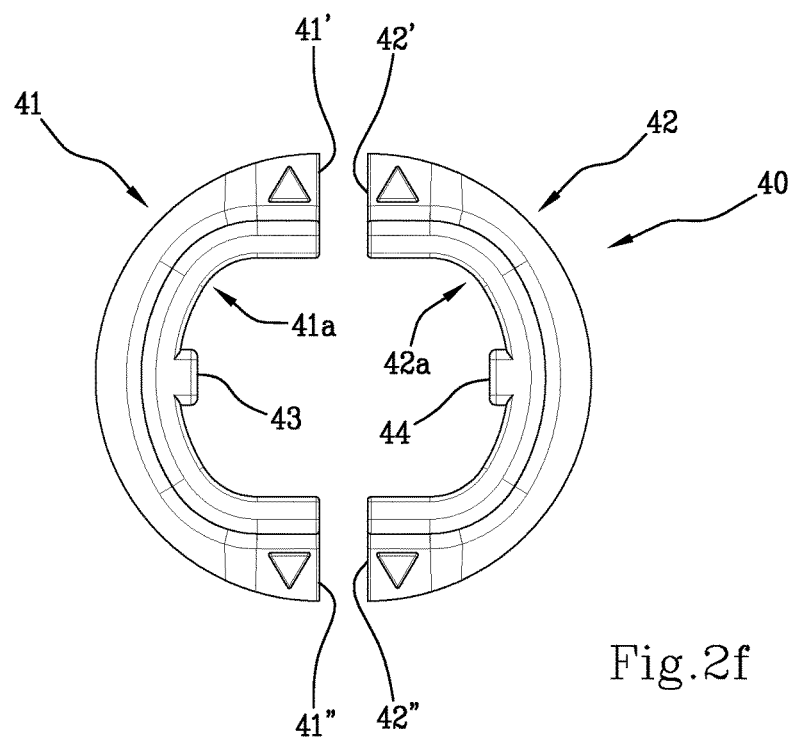
Figure 4A:
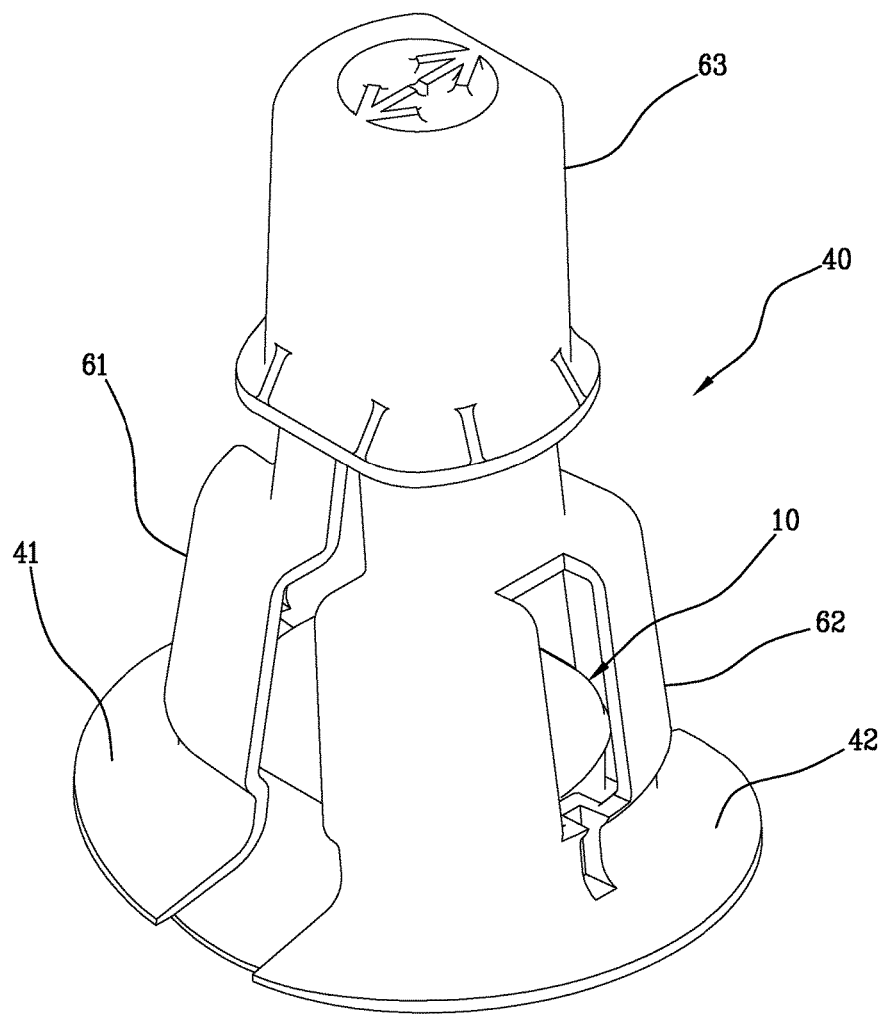
FIG. 4a schematically shows a perspective view of a positioning device, in accordance with a third embodiment of the invention, associated with a monitoring device.
Figure 4B:
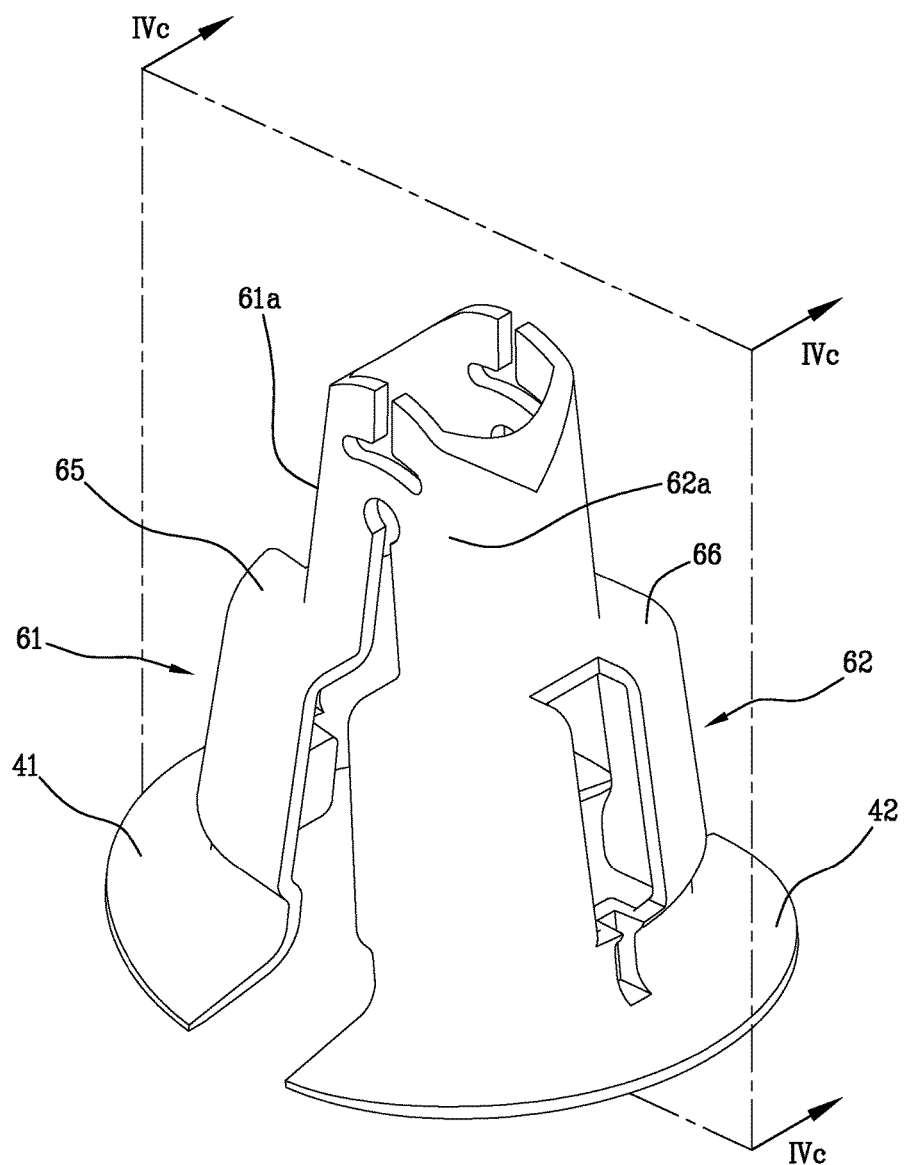
FIG. 4b schematically shows a perspective view of the positioning device of FIG. 4a in a first operative condition.
Figure 4C:
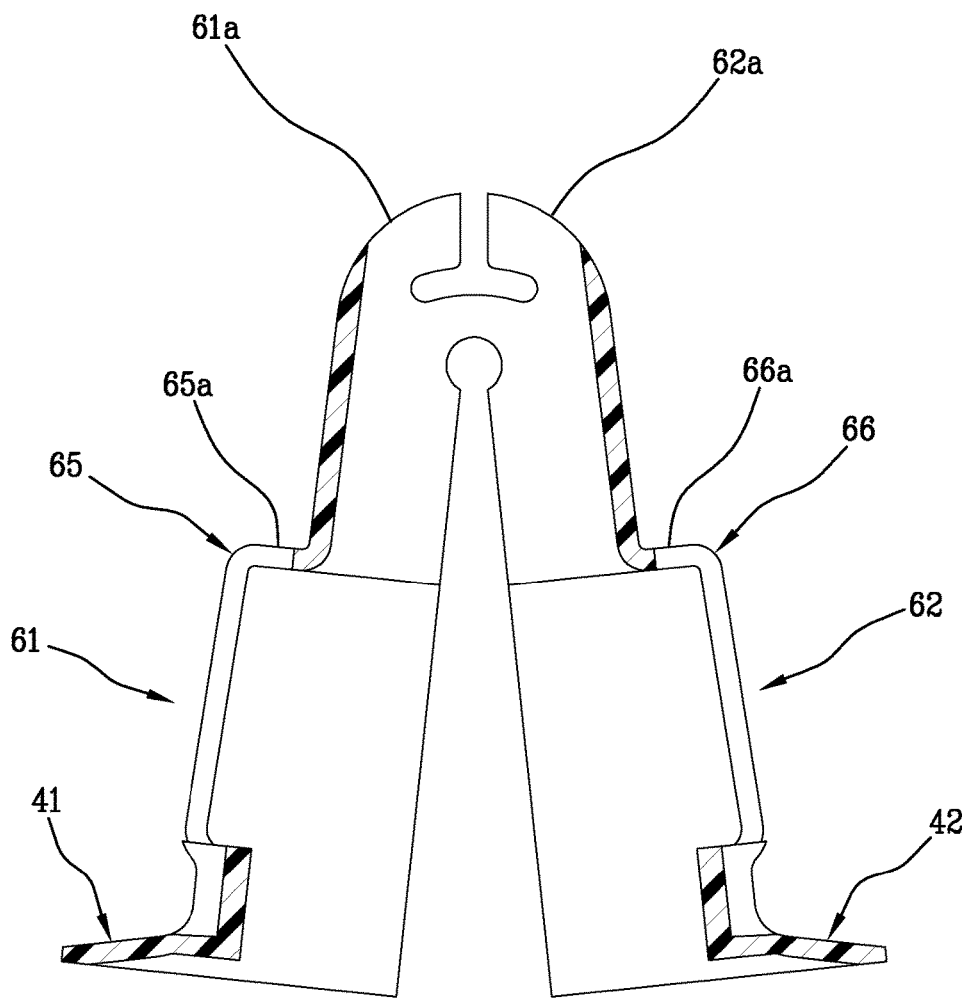
FIG. 4c schematically shows a sectional view of the positioning device of FIG. 4b, along the line IVb-IVb.
Figure 5A:
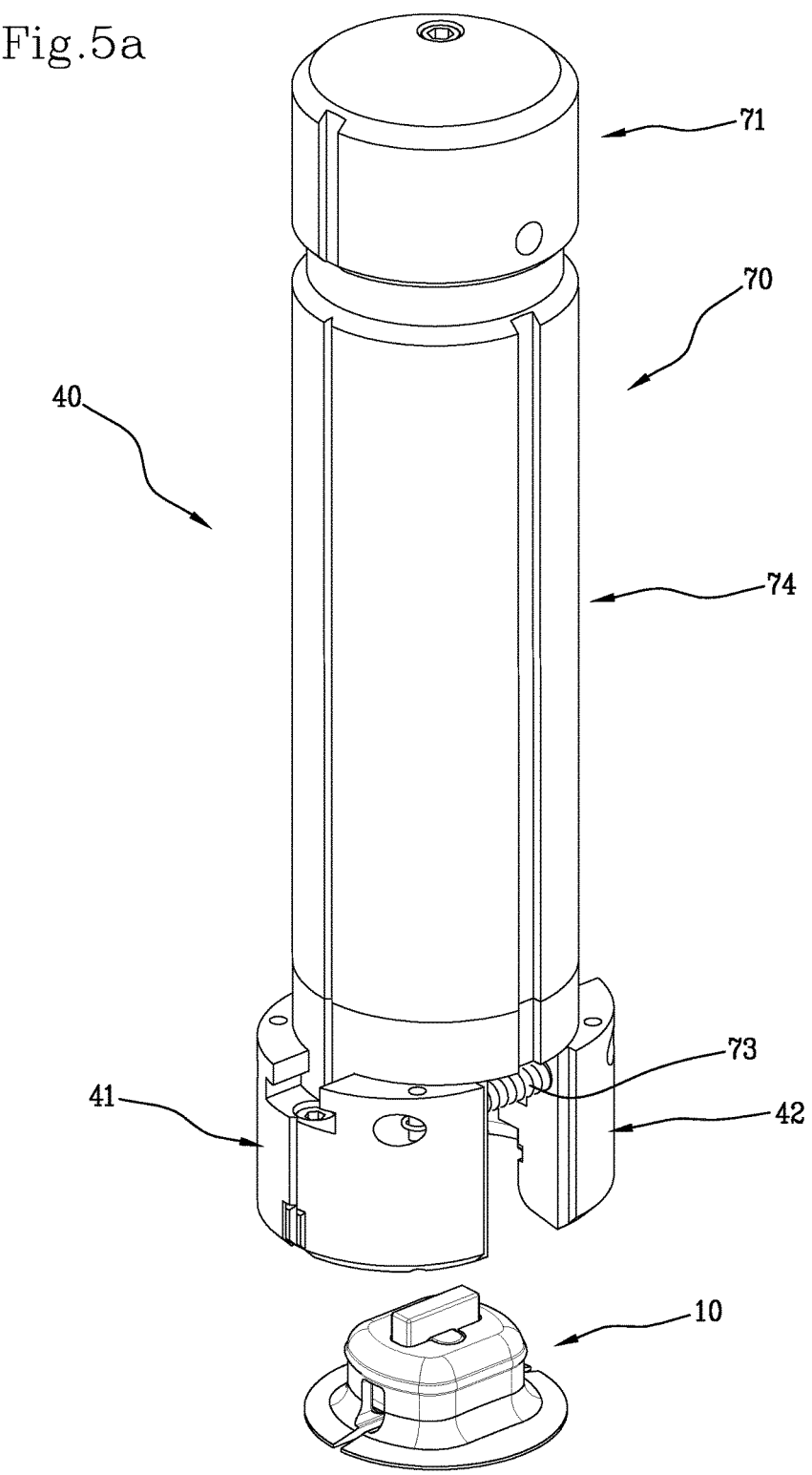
FIG. 5a schematically shows a perspective view of a positioning device, in accordance with a fourth embodiment of the invention, in a first operative condition.
Figure 5B:
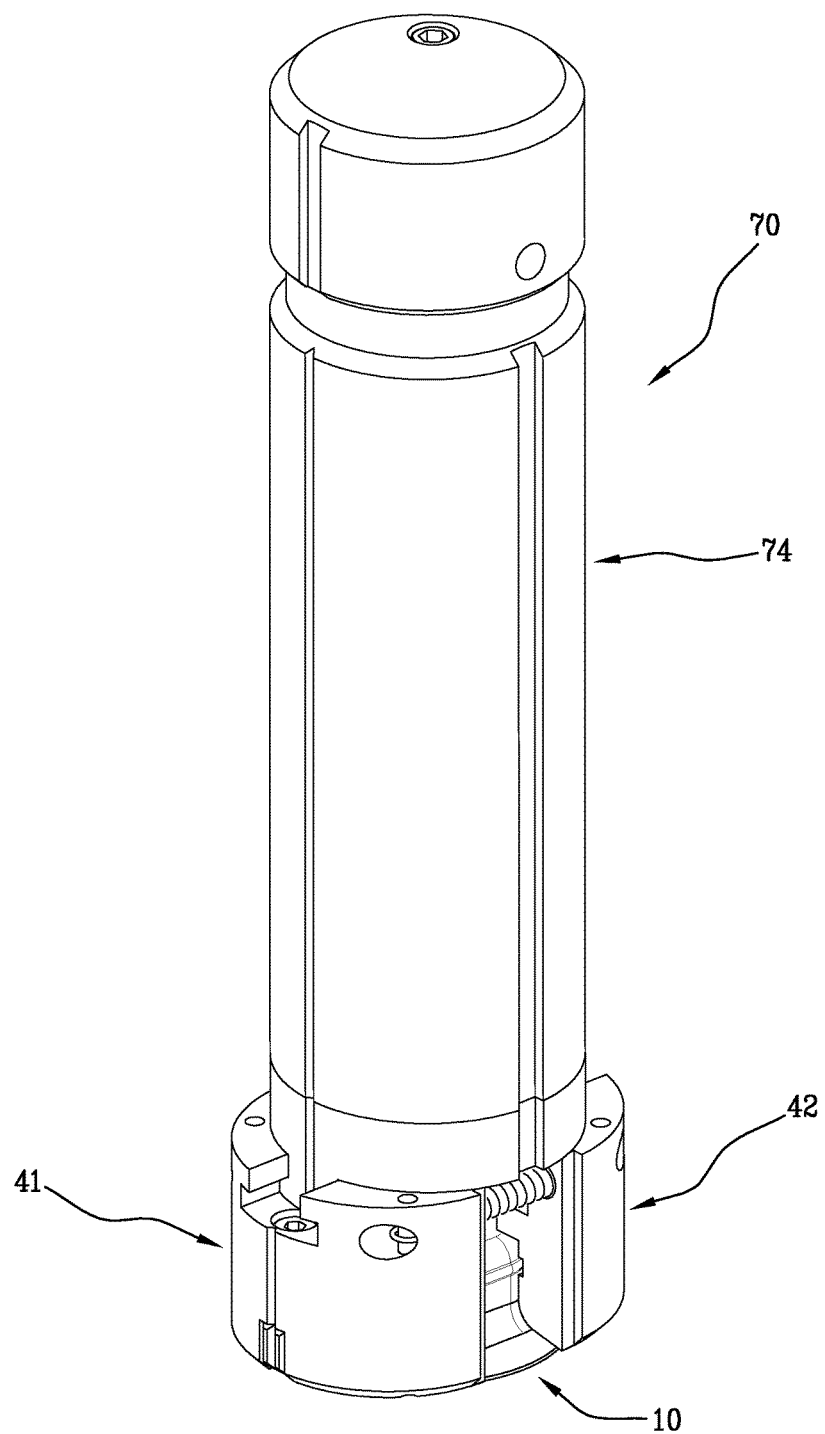
FIG. 5b shows the positioning device of FIG. 5a, associated with a monitoring device.
Figure 5D:
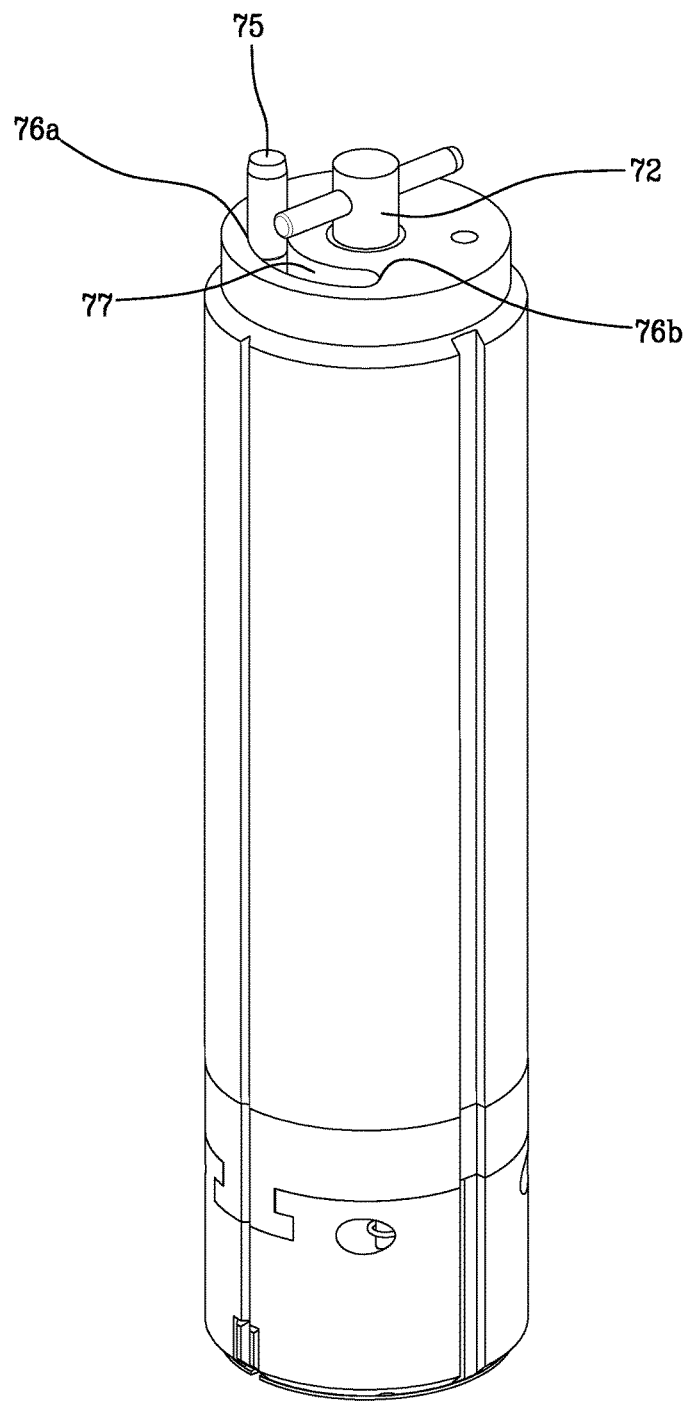
FIG. 5d shows the device of FIG. 5c with some parts removed, in order to better illustrate other parts thereof.
Figure 5E:
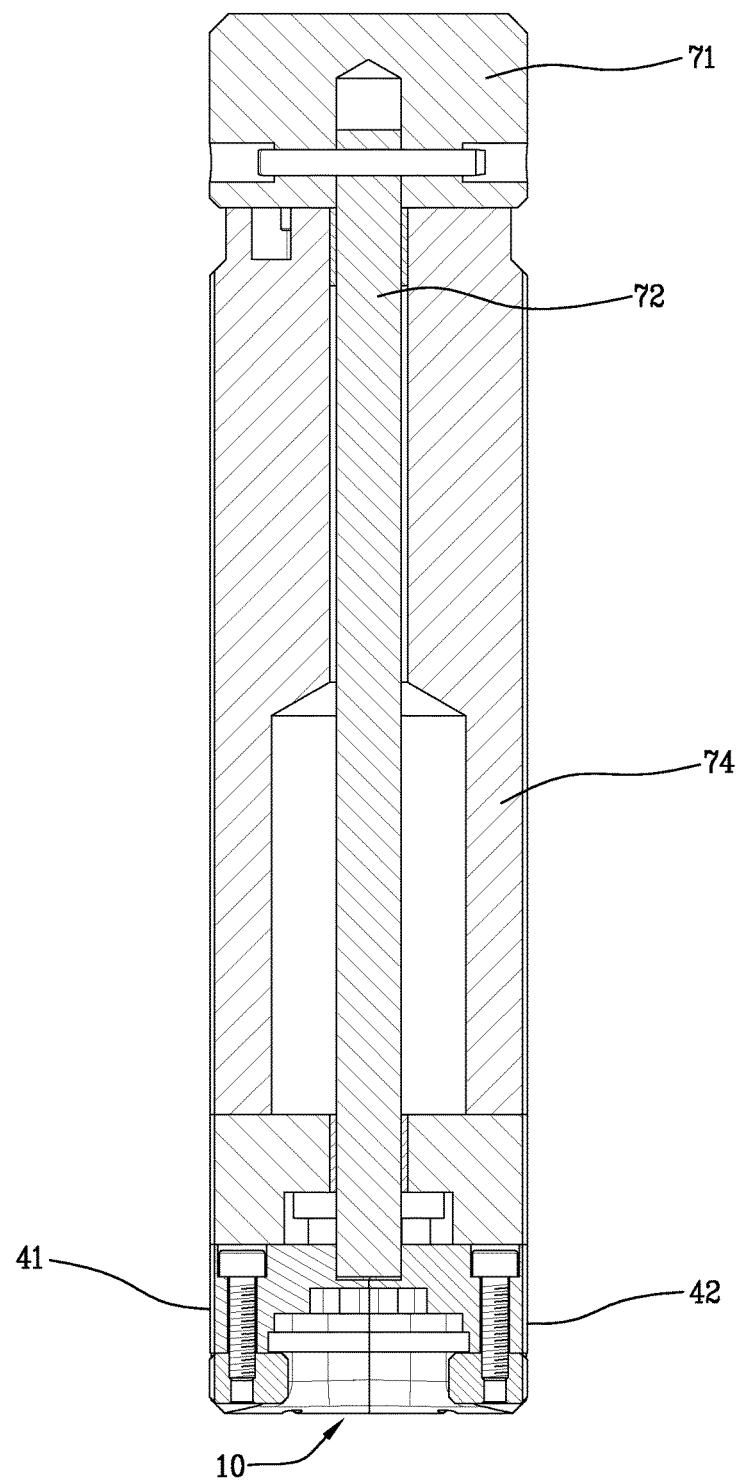
FIG. 5e shows a sectional view, along the line Ve-Ve, of the positioning device and the monitoring device of FIG. 5c.

When the positioning device 40 is associated with the monitoring device 10, the ends of each of the active portions 41, 42 are substantially in contact with the ends of the other active portion. In practice, as schematically shown in FIG. 2f, the ends 41', 41" of the active portion 41 are substantially in contact with the corresponding ends 42', 42" of the active portion 42.

Preferably, each of the active portions 41, 42 comprises a respective expansion 43, 44 extending from the respective main surface 41a, 42a.

Preferably, when the positioning device 40 is associated with the monitoring device 10, each respective expansion 43, 44 is inserted between the base portions 31, 32.

Preferably, the respective expansions 43, 44 are inserted between the base portions 31, 32 from opposite sides of the monitoring device 10 with respect to the electronic unit 20.

In a preferred embodiment, the respective expansions 43, 44 are inserted in the abovementioned side windows 37a, 37b which separate the side walls 33, 34 of the lower structure 30b of the connecting member 30.

In a different embodiment, the expansions 43, 44 are inserted between the base walls 35, 36.

Preferably, each of said main surfaces 41a, 42a has a given conformation. Such conformation can be appreciated in section, evaluated when the positioning device 40 is associated with the monitoring device 10, according to at least one plane substantially perpendicular to a plane defined by the base surfaces 35a, 36a of the base portions 31, 32. The conformation of each of the main surfaces 41a, 42a is substantially L-shaped and comprises a first 45, 46 and a second 47, 48 portion.

The first portion 45, 46 of the substantially L-shaped conformation substantially matches the shape of an outer surface of a respective side wall 33, 34 of the lower structure 30b of the connecting member 30.

The second portion 47, 48 of the substantially L-shaped conformation substantially matches the shape of an outer surface of a respective base wall 35, 36 of the lower structure 30b.

Once the monitoring device 10 is maintained in the installation condition, the base portions 31, 32, and in particular the base surfaces 35a, 36a, are fastened to the inner surface 2 of the tyre 1. This is due to a pressure action exerted (typically in a direction substantially orthogonal to the inner surface of the tyre 2) on the positioning device 40. Such pressure can be exerted for example manually on the outer surface of the active portions 41, 42.

Preferably, the monitoring device 10 is fastened in such a manner that the major extension direction X of the separation region Z is disposed substantially in a radial plane of the tyre 1.

The fastening of the monitoring device 10 to the inner surface 2 can be executed, for example, by means of bonding.

Preferably, before proceeding with the fastening, the portion of the inner surface 2 of the tyre 1 where the monitoring device will be positioned undergoes a cleaning operation, for example by means of laser or chemical and/or mechanical agents.

After the monitoring device 10 has been fastened to the inner surface of the tyre 1, the positioning device 40 is removed.

Preferably the removal of the positioning device 40 comprises moving the main surfaces 41a, 42a away from the respective outer-surface S portions P1, P2 of the monitoring device 10.

Preferably, in order to move the active portions 41, 42 away from the monitoring device 10, the same active portions 41, 42 are moved along directions substantially parallel to the plane defined by the abovementioned base surfaces 35a, 36a.

Preferably such directions are substantially parallel to the major extension direction X of the separation region Z.

In a first embodiment, the positioning device 40 comprises preferably only the two abovementioned active portions 41, 42 (FIGS. 2a-2f).

Such active portions 41, 42 can be associated with the monitoring device 10, and removed from the same at the end of the fastening operation, also manually.

In order to facilitate a correct orientation of the mounting device 10 (as said, the latter is preferably fastened in such a manner that the major extension direction X of the separation region Z is disposed substantially in a radial plane of the tyre 1), at the ends 41', 41", 42', 42" graphical symbols 49 can be suitably predisposed, for example in relief; such graphical symbols 49 allow visually identifying a direction substantially orthogonal to the major extension direction X of the separation region Z (i.e. a circumferential direction of the tyre 1).

In this manner, an installer who manually executes the fastening operation has all the indications required for a correct orientation of the monitoring device 10, even though the separation region Z is not visible, since it is covered by the active portions 41, 42.

In a second embodiment (FIGS. 3a-3b), the positioning device 40 further comprises a ring nut 50, which can be fitted around the active portions 41, 42 so as to maintain the same mutually associated.

Preferably, the ring nut 50 is made of metallic material, such as aluminium or steel, or plastic material, such as nylon, Teflon or Bakelite.

Preferably the positioning device 40 further comprises a piston 51, insertable into said ring nut 50 from the opposite side with respect to the monitoring device 10.

Preferably, the piston 51 is made of metallic material, such as aluminium or steel, or plastic material, such as nylon, Teflon or Bakelite.

Preferably the piston 51 has an outer surface 52, having substantially cylindrical extension, for example, along which the ring nut 50 can slide.

The piston 51 can be advantageously employed for promoting fastening of the monitoring device 10 to the inner surface 2 of the tyre 1. Indeed, after positioning the monitoring device on the inner surface 2 of the tyre 1, associating the active portions 41, 42 with the monitoring device 10, fitting the ring nut 50 outside the active portions 41, 42, and inserting the piston 51 into the ring nut 50, a force can be exerted on the piston 51 itself in a direction substantially orthogonal to the inner surface 2 of the tyre 1. Given that the piston 51 is substantially in contact with the monitoring device 10, such force is transmitted to the monitoring device 10 itself, thus promoting the fastening of the latter to the inner surface 2. The pressure is distributed substantially uniformly along the perimeter of the monitoring device 10 due to the active portions 41, 42. Indeed, possible forces in a direction parallel to the inner surface 2 of the tyre 1 tending to move the base portions 31, 32 of the connecting member 30 close together are obstructed by the presence of the expansions 43, 44; possible forces in a direction parallel to the inner surface 2 of the tyre 1 tending to move the base portions 31, 32 of the connecting member 30 apart are obstructed by the presence of the ring nut 50.

Once the fastening operation has terminated, the ring nut 50 and the piston 51 can be removed, preferably before the active portions 41, 42 are moved away from the monitoring device 10.

Preferably, the piston 51 has an end stop element 53 for said ring nut 50. The end stop element 53 intercepts the ring nut in the movement thereof away from the inner surface 2 of the tyre 1 so that, by continuing such movement, the ring nut and the piston 51 can be integrally moved away from the monitoring device 10.

By way of example, the end stop element 53 can comprise a plate-like element, with substantially circular element, having greater diameter relative to said piston 51 and mounted in a substantially concentric manner on the latter.

In a third embodiment (FIGS. 4a-4e), the positioning device 40 comprises, in addition to the active portions 41, 42, also a pair of lever elements 61, 62.

Each lever element 61, 62 is extended from a respective one of the active portions 41, 42.

Each lever element 61, 62 has a distal end 61a, 62a relative to the corresponding active portion 41, 42.

Preferably the distal ends 61a, 62a of the lever elements 61, are mutually associated with each other in such a manner that the positioning device 40 can be configured between an open condition and a closed condition.

In the open condition, the active portions 41, 42 are sufficiently spaced so that the monitoring device 10 can be positioned between the active portions 41, 42 themselves.

In the closed condition, the active portions 41, 42 are closed around monitoring device 10 under the action of the lever elements 61, 62.

The mutual bond between the distal ends 61a, 62a of the lever elements 61, 62 can be obtained, for example, by making the two lever elements 61, 62 as a single piece, made of elastically deformable material, or by means of a pin that allows the two lever portions 61, 62 to rotate with respect to each other along a rotation axis defined by the longitudinal extension of the pin itself.

In this embodiment, the positioning device 40 further comprises a hooping member 63, which can be fitted at least partly around said lever elements 61, 62 and/or said active portions 41, 42 to keep the positioning device 40 in the closed condition.

Preferably, the hooping member 63 is fitted on the lever elements 61, 62 at the distal ends 61a, 62a, i.e. on the opposite side with respect to the active portions 41, 42.

Preferably at least one of the lever elements 61, 62 has a shoulder 65, 66 having a respective abutment surface 65a, 66a which acts as an end stop for the hooping member 63, when the latter is fitted around the lever portions 61, 62.

Preferably, the hooping member 63 is associated with a thrust element 64 which, when the positioning device 40 is in the closed condition and the hooping member 63 is fitted on the lever elements 61, 62 and/or on the active portions 41, 42, is extended between the lever elements 61, 62 themselves and comes into contact with the monitoring device 10. The thrust element 64 thus allows exerting a force, on the monitoring device 10, which promotes the fastening of the latter to the inner surface 2 of the tyre 1.

Preferably, graphical signs 67 are predisposed on the top of the hooping member 63, such graphical signs 67 allowing a correct orientation of the monitoring device 10 during the fastening operation.

Therefore, by employing a positioning device 40 in accordance with this third embodiment, the installation method can comprise one or more of the following actions:

configuring the positioning device 40 in the open condition; this operation can be executed, for example, by manually mutually moving the active portions 41, 42 apart, by acting on the same and/or on the respective lever elements 61, 62;

positioning the monitoring device 10 between the active portions 41, 42;

while the monitoring device 10 is interposed between the active portions 41, 42, configuring the positioning device 40 in the closed condition; even this operation can be manually executed, for example, by acting directly on the active portions 41, 42 and/or on the respective lever elements 61, 62;

fitting the hooping member 63 around the lever elements 61, 62 and/or the active portions 41, 42, and bringing the thrust element 64 in contact with the monitoring device 10;

executing the fastening operation, preferably promoting it by exerting on the monitoring device 10, by means of the thrust element 64, a force substantially orthogonal to the surface 2 of the tyre 1;

at the end of the fastening operation, configuring the positioning device 40 in the open condition, mutually moving the active portions 41, 42 apart.

In a fourth embodiment (FIGS. 5a-5d), the positioning device 40 comprises, in addition to the two active portions 41, 42, an actuator member 70 configured for driving said active portions 41, 42 between a mutually moved apart position and a mutually moved close position.

Preferably, the actuator member 70 comprises a command element 71, that can be actuated in rotation, and a transmission element 72, interlocked with said command element 71, for moving the active portions 41, 42 upon the actuation of the command element 71 itself.

Preferably, the transmission element 72 can be configured in a first condition, in which it causes mutual moving apart between the active portions 41, 42, and a second condition, in which it allows mutual moving close between the active portions 41, 42.

Preferably, the actuator member 70 further comprises at least one elastic-return structure 73 for moving the active portions 41, 42 close to each other when the transmission element 72 is in the second condition.

Preferably the positioning device 40 further comprises a support structure 74, for example having a substantially cylindrical conformation.

The active portions 41, 42, together with the actuator member 70, are advantageously mounted on the support structure 74.

By way of example, the elastic-return structure 73 can comprise a pair of springs, each having a first end fastened to a respective one of the active portions 41, 42, and a second end fastened to the other active portion.

Preferably, said positioning device 40 further comprises a stop element 75, which is moved upon the movements of said command element 71 and/or transmission element 72. In a preferred embodiment, the stop element 75 is substantially integral with the command element 71 and/or with the transmission element 72.

The stop element 75 is adapted to cooperate with one or more abutment surfaces 76a, 76b, defining respective end stop positions for said stop element 75.

Preferably, said one or more abutment surfaces 76a, 76b are internal surfaces of a recess 77 obtained in the support structure 74.

In practice, when the command element 71 and/or the transmission element 72 are moved, typically for driving the active portions 41, 42 between the mutually moved close position and the mutually moved apart position, the stop element 75 is moved along the recess 77. When the stop element 75 is in abutment on one of the abutment surfaces 76a, 76b, it stops the command element 71 and the transmission element 72, since the active portions 41, 42 have reached the end configuration thereof, i.e. one of the above-mentioned mutually moved close or mutually moved apart positions.

Hence, by employing a positioning device 40 in accordance with this fourth embodiment, the installation method can comprise one or more of the following actions:
  operating the actuator member 70 for driving the active portions 41, 42 in the mutually moved apart position;
  positioning the monitoring device 10 between the active portions 41, 42;
  while the monitoring device 10 is interposed between the active portions 41, 42, operating the actuator member 70 for driving the active portions 41, 42 themselves in the mutually moved close position;
  executing the fastening operation;
  once the fastening operation has terminated, operating the actuator member 70 for driving the active portions 41, 42 in the mutually moved apart position.

A kit for installing the monitoring device 10 in the tyre 1 is also an object of the present invention.

Such kit comprises the monitoring device 10 and the positioning device 40. The kit typically comprises an adhesive (e.g. cyanoacrylate-based glue) to be affixed to the base surfaces 35a, 36a of the connecting member 30 for the purpose of fastening the monitoring device 10 to the inner surface 2 of the tyre 1. The kit typically also comprises materials for the treatment and cleaning of the inner surface 2 of the tyre 1 (e.g. chemical and/or mechanical agents).

By employing the abovementioned first embodiment of the positioning device 40, which substantially comprises the single active portions 41, 42, a kit can be sold having the active portions 41, 42 already associated with the monitoring device 10. In other words, the kit thus achieved allows supplying the monitoring device 10 already correctly configured and maintained, by means of the active portions 41, 42, in the installation condition. The monitoring device 10 is then ready to be fastened to the inner surface 2 of the tyre 1.

The invention claimed is:

1. A method for installing a monitoring device in a tyre for vehicle wheels, comprising:
  providing the monitoring device, which comprises:
    an electronic unit; and
    a connecting member having an upper structure and a lower structure that, in cooperation, define a housing for said electronic unit, said lower structure comprising two base portions separated from each other by a separation region, each of said base portions having a respective side wall and a respective base wall, each base wall having a base surface associable with an inner surface of the tyre;
  providing a positioning device comprising two active portions distinct from each other, each active portion having a main surface the shape of which matches that of a respective portion of an outer surface of said monitoring device and having a respective expansion extending from its respective main surface, said active portions being adapted to cooperate with at least said base portions;
  associating said positioning device with said monitoring device with the electronic unit housed within said connecting member, to keep said monitoring device in an installation condition in which said base portions are maintained at a given mutual distance across said separation region by said active portions, said associating comprising:
    moving each active portion from opposite sides of said monitoring device along a plane crossing the electronic unit, said plane being parallel to the base surfaces, wherein the expansions move within the plane and toward the electronic unit to become laterally adjacent to the electronic unit by inserting each expansion between the side walls and on top of the base walls of said base portions on said opposite sides of the monitoring device;
  fastening said base portions to the inner surface of said tyre, while the monitoring device is kept in said installation condition by said associated positioning device; and
  after having fastened said base portions to the inner surface of said tyre, removing said positioning device so that said monitoring device is mounted on the inner surface of the tyre with the electronic unit housed within said connecting member.

2. The method as claimed in claim 1, wherein the step of associating said positioning device with said monitoring device comprises putting each of said main surfaces in a condition of substantial mutual contact with the respective outer-surface portions of said monitoring device.

3. The method as claimed in claim 1, wherein said positioning device, when associated with said monitoring device by the step of associating, surrounds said electronic unit in said plane.

4. The method as claimed in claim 1, wherein each of said active portions, seen in plan view, has a pair of ends between which said shape of the main surface is curved, wherein, when said positioning device is associated with said monitoring device by the step of associating, each end of each of said active portions is in contact with a respective one of the ends of the other active portion and the main surfaces surround the outer surface of said monitoring device.

5. The method as claimed in claim 1, further comprising:
  after the step of associating said positioning device with said monitoring device, fitting a ring around said active portions, so that the ring maintains said active portions of said positioning device associated one with the other.

6. The method as claimed in claim 5, further comprising:
  inserting a piston into said ring from an opposite side relative to said monitoring device, said ring being slidably associable with an outer surface of said piston.

7. The method as claimed in claim 6, further comprising:
  moving said ring and piston away from said monitoring device before the step of removing said positioning device.

8. The method as claimed in claim 1, wherein the step of associating said positioning device further comprises: driving said active portions to a mutually moved apart position; positioning said monitoring device between said active portions; and driving said active portions to a mutually moved close position.

9. The method as claimed in claim 8, wherein the step of removing said positioning device further comprises: driving said active portions to said mutually moved apart position; and moving said positioning device away from said monitoring device.

10. The method as claimed in claim 1, wherein said base portions are fastened to the inner surface of said tyre by way of an adhesive.

\* \* \* \* \*